Nov. 14, 1950 T. W. CHEW 2,529,485

COLOR TELEVISION

Filed Oct. 9, 1945 7 Sheets-Sheet 1

Inventor

THORNTON W. CHEW

By Ralph L Chappell

Attorney

Nov. 14, 1950

T. W. CHEW

COLOR TELEVISION 2,529,485

Filed Oct. 9, 1945

7 Sheets-Sheet 2

Inventor

THORNTON W. CHEW

By Ralph L Chappell

Attorney

Nov. 14, 1950 T. W. CHEW 2,529,485

COLOR TELEVISION

Filed Oct. 9, 1945 7 Sheets-Sheet 3

Inventor
THORNTON W. CHEW

By Ralph L. Chappell

Attorney

Nov. 14, 1950 T. W. CHEW 2,529,485

COLOR TELEVISION

Filed Oct. 9, 1945 7 Sheets-Sheet 4

Inventor
THORNTON W. CHEW

By Ralph L. Chappell

Attorney

Inventor
THORNTON W. CHEW
By Ralph L Chappell
Attorney

Nov. 14, 1950 T. W. CHEW 2,529,485

COLOR TELEVISION

Filed Oct. 9, 1945 7 Sheets-Sheet 6

Inventor
THORNTON W. CHEW

By Ralph L Chappell
Attorney

Inventor
THORNTON W. CHEW

By Ralph L. Chappell

Attorney

Patented Nov. 14, 1950

2,529,485

UNITED STATES PATENT OFFICE 2,529,485

COLOR TELEVISION

Thornton W. Chew, United States Navy

Application October 9, 1945, Serial No. 621,397

33 Claims. (Cl. 178—5.2)

(Granted under the act of March 3, 1883, as amended April 30, 1928; 370 O. G. 757)

This invention relates to television systems and more particularly to methods of and means for producing television images in their natural color or in perspective.

In one method of natural color television, images are transmitted by forming partial images of the object seen in terms of each of the primary colors (red, green, and blue), and then superimposing these partial images at the receiver to form a composite image in natural color. In one receiving system, for use with this method, the partial images are selected by mechanically alternating a group of color filters intercepting the optical path to the cathode ray tube screen. This mechanical method requires high speed moving parts with consequent noise, vibration, and wear. The color filters must be relatively large and complicate cabinet design. Furthermore, the light lost in the filters reduces the intensity of the usable image and synchronization with the transmitter is more difficult than in an electronic system.

In another receiving system which avoids the use of mechanically alternated color filters, the partial images corresponding to the separate colors are displayed on separate interleaved and superposed luminescent surfaces each surface being excited to one of the three primary colors by a separate electron beam. The requirement of separate scanning beams creates a serious problem of obtaining and maintaining three rasters of identical size, position and shape, and of providing compensation for "keystoning" resulting from the nonperpendicularity of the beam to the plane of the screen. Furthermore, three separate scanning systems are required.

It has been proposed to employ a picture screen having a plurality of extremely narrow adjacent strips of fluorescent material with every third strip adapted to produce light of one of the three primary colors. This may be accomplished by use of filters or by use of three phosphors each producing one of the three primary colors directly. The screen elements are made so small compared to one image element that any image element may appear to be presented in any one of the three primary colors, or any combination of these three colors. A single image-modulated electron beam successively scans each separate color group of elements in synchronism with the transmitter. The partial images presented by the three color groups of elements are then added by persistence of vision of the human eye to form a composite natural color image.

The above mentioned method of color television requires a very fine and precise adjustment in the deflection of the image display or presentation tube electron beam because the individual strips or elements must be of extremely small width in order that they not be discernible from another by the unaided human eye at a useful viewing distance from the screen. Heretofore, it has been impossible to adjust the scanning of the image display or presentation tube electron beam to accomplish this precise adjustment. This is not only the result of difficulty in achieving the necessary exact control of the deflecting fields but also is caused by small external influences such as the earth's magnetic field, stray electric fields, etc. These influences, acting early in the beam path can cause a significant error at the screen where precise adjustment is required.

In Patent 2,307,188, it is proposed to accomplish the necessary exact control of the electron beam by applying an electric potential of proper polarity between the various screen elements so that the electrons will be urged toward the desired color element. That is, a relatively positive and static electric charge which attracts the negative electrons is applied to the particular color element it is desired to excite to luminescence. This requires high potential between the adjacent screen elements to achieve the necessary control over the electron stream. The requirement of resolution of image details demands that each screen element be spaced from the other, center to center, a distance less than the dimension of one image element. This small spacing will not permit these high voltage differences between elements since arcs will occur and the screen will be damaged. Furthermore, these high voltages are most economically supplied from high impedance sources, and since the elements have considerable capacity, it is difficult to apply square wave voltages to them.

In accordance with this invention, these difficulties are avoided by utilizing magnetic fields rather than electric fields to cause the electron beam to impinge accurately upon the desired color element. It is well known that an electron proceeding in the same general direction as a magnetic field will tend to follow the course of the magnetic flux lines; and further, that an electron crossing a magnetic flux line will be deflected in a direction normal both to its original direction of motion and the direction of the flux line. In accordance with my invention, magnetic flux lines are made to pass through or near the desired screen element in such a manner that electrons emanating from the cathode and directed in the general direction of the desired screen element will be deflected to that screen element.

In one form of my invention, I accomplish this result by passing current through the wires comprising the screen elements and by properly changing the current passing through the elements to cause the electron beam to be urged successively toward elements having the color response desired. In another form of my invention, I provide a combination of diamagnetic and paramagnetic materials and produce the necessary flux lines by alternate excitation of longitudinal and transverse magnetic fields. In a third form of my invention, a transverse magnetic field is utilized in conjunction with color phosphors located in protected spaces of a single set of screen elements.

The primary object of this invention is to provide a method of and a means for reproduction of television images in color.

Another object of this invention is to provide a method of and a means for reproduction of television images in perspective.

A further object of this invention is to provide more accurate scanning of an electron beam.

Also in accordance with my invention more accurate scanning of an electron beam is accomplished without high potentials by the use of magnetic fields.

In accordance with other aspects of my invention, more accurate scanning of an electron beam is accomplished by the use of interspersed paramagnetic and diamagnetic screen particles, together with transverse and longitudinal magnetic fields.

In accordance with a further aspect of my invention, more accurate scanning of an electron beam is achieved by a screen composed of oppositely spaced protected luminescent surfaces, together with a magnetic field.

Other objects and aspects of this invention will be apparent from the following specifications and claims.

In the drawings: Figure 1 is a general view of the preferred form of my invention showing the cathode ray tube and screen elements.

Figure 15A:
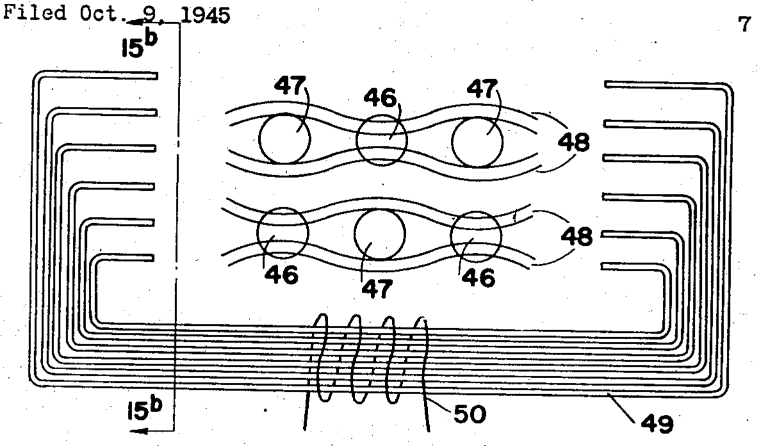
Figure 15B:

Figures 15*a* and 15*b* are greatly magnified longitudinal and transverse views of an alternate embodiment of my invention utilizing paramagnetic and diamagnet screen elements.

Figure 16:
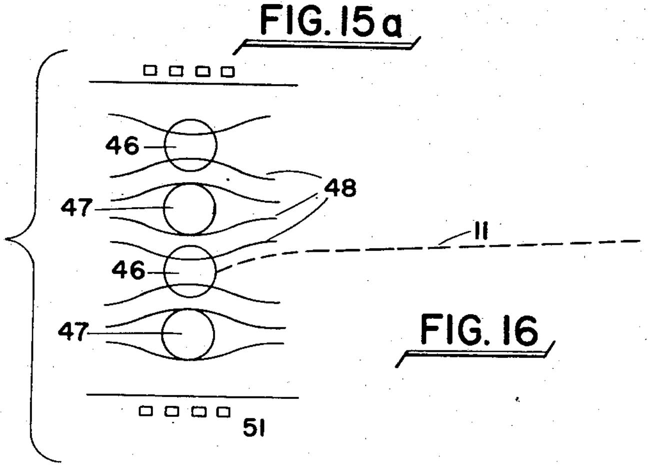

Figure 16 is a magnified cross section through coil 51.

Figure 17:
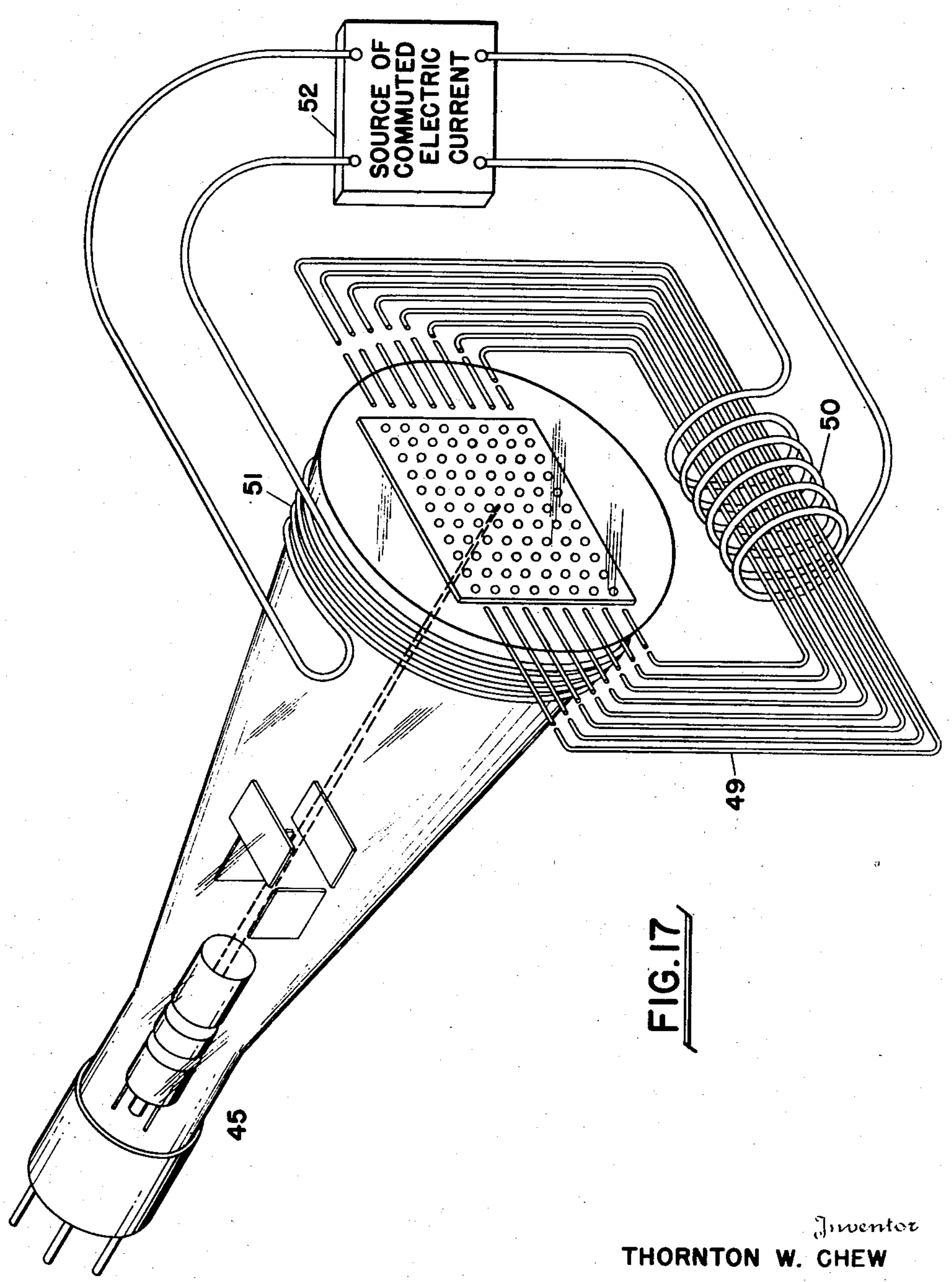

Figure 17 shows a general view of the alternate embodiment of my invention as shown in Figures 15 and 16.

Figure 18:
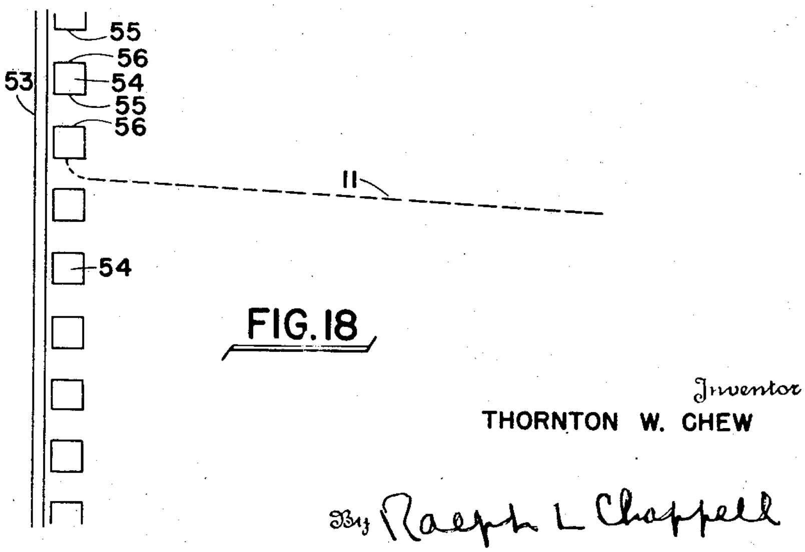

Figure 18 shows a greatly magnified view of a third form of my invention.

Figure 19:
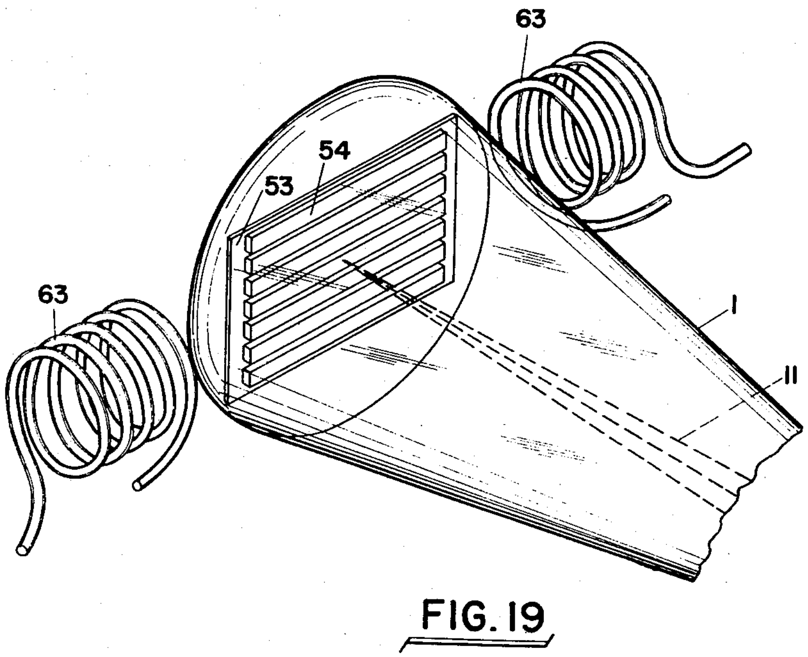

Figure 19 shows in perspective my invention illustrated in Figure 18.

Figure 20:
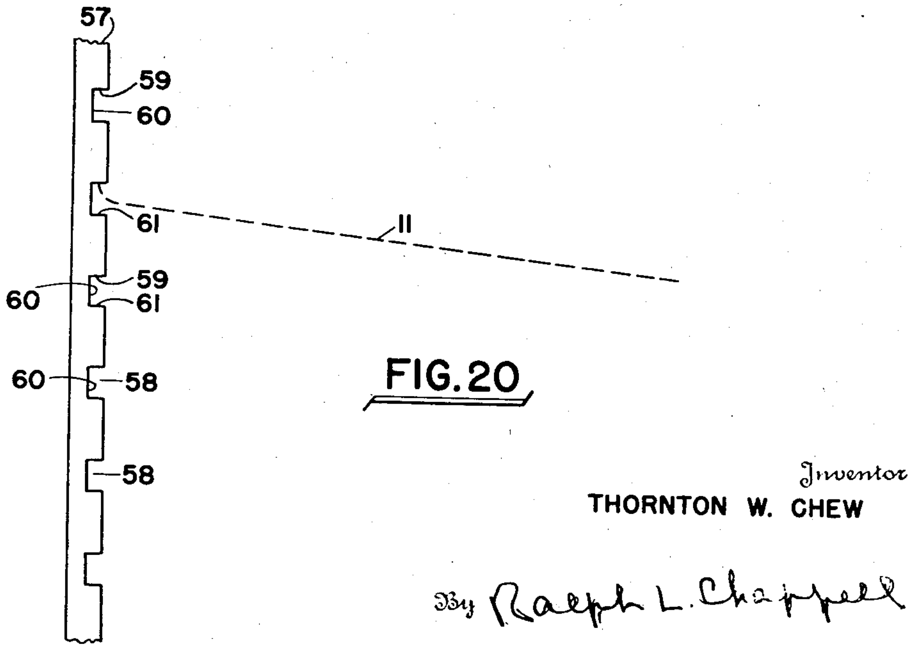

Figure 20 shows a greatly magnified view of an additional form of my invention.

Figure 1:
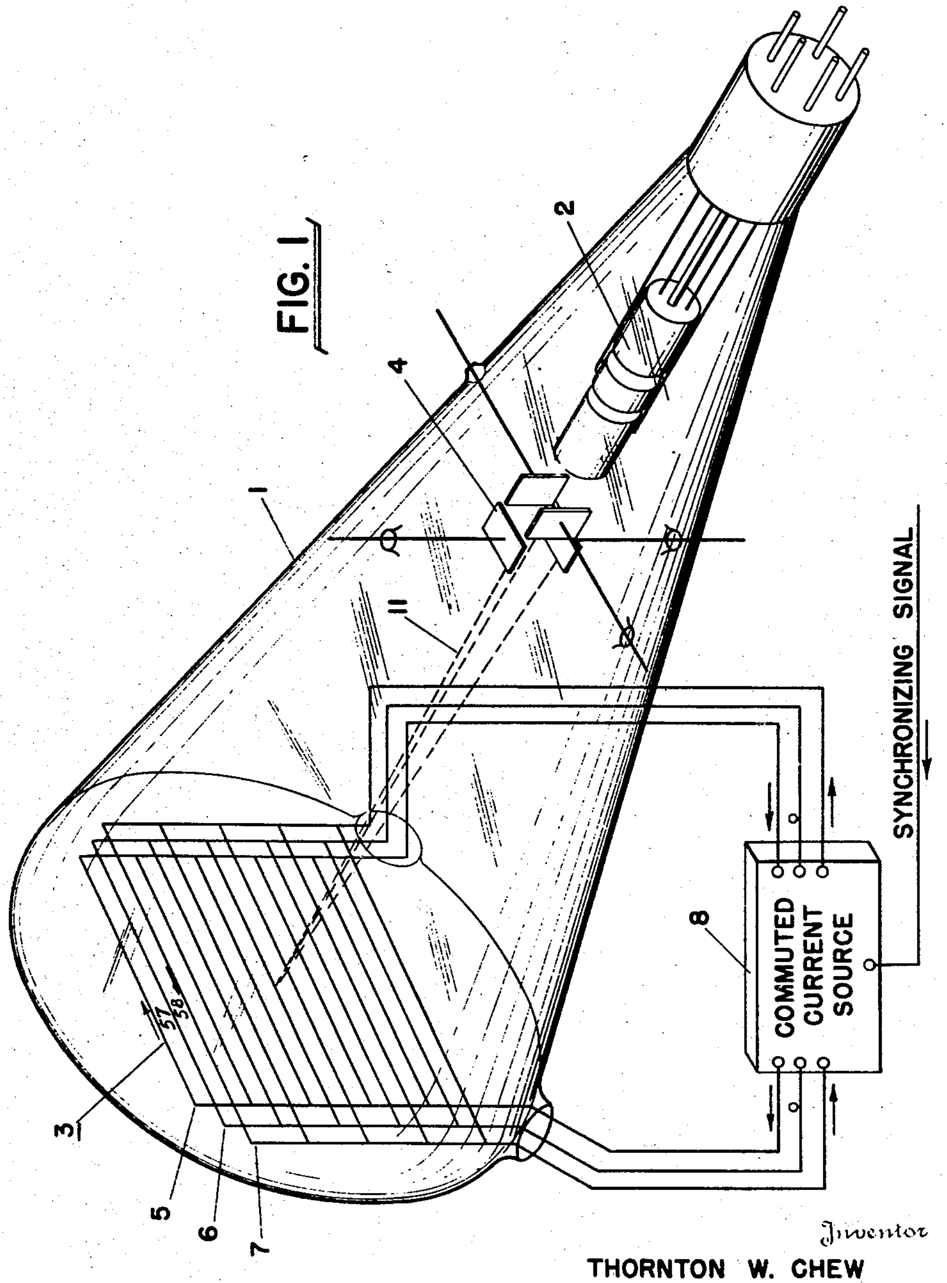

Referring in more detail to Figure 1, a cathode ray tube 1, containing electron beam producing means 2 and electrostatic deflection plates 4 is provided with screen 3 composed of three separate groups of parallel elements 5, 6, and 7. Electron producing means 2 generates an electron beam 11 adapted to strike image screen 3 and to be deflected across its area in synchronism with the transmission system by the electrostatic field between deflection plates 4.

Figure 2:
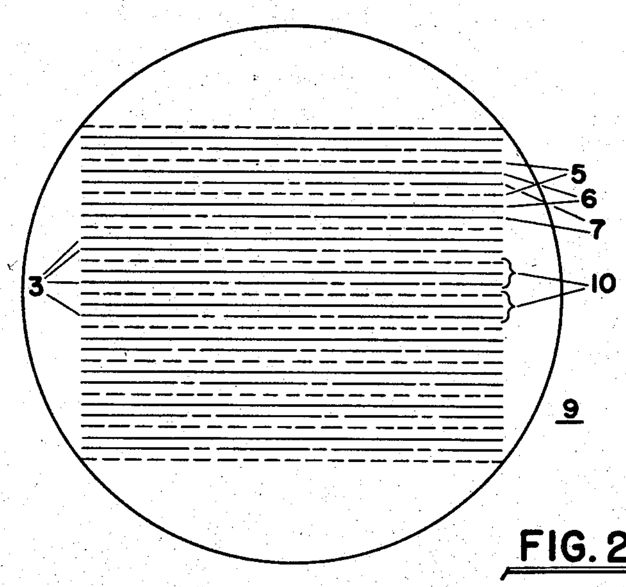
Figure 2 is an expanded plan view of the screen of the tube shown in Figure 1 showing the disposition of image elements.

The structure of image screen 3 may be better understood by reference to Figure 2. As shown in Figure 2, the image screen comprises three separate groups of parallel screen elements, 5, 6 and 7. These three groups are assembled alternately so that any adjacent three elements, 10, comprise screen elements of the three separate color groups. One group, say 5, is provided with a luminescent material or filter of green color. A second group, say 6, is provided with a luminescent material or filter of red color. A third group, say 7, is provided with a luminescent material or filter of blue color. Hence, scanning of each group of three adjacent elements 10 produces an image containing all of the three primary colors. This image will appear as natural color because of the persistence of vision and the inability of the human eye to distinguish separate screen elements in image element group 10.

Figure 3:
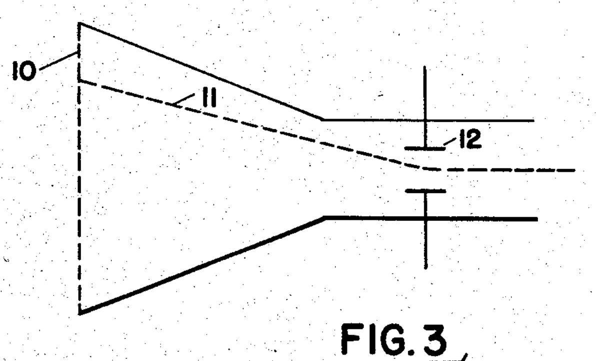
Figure 3 is a longitudinal section of the tube of Figure 2 showing the limit of control of the electron beam by conventional scanning methods.

Figure 3 shows a longitudinal cross section of my tube as shown in Figure 2. In Figure 3, the electron beam 11 is caused to impinge upon surface of a group such as 10 by electrostatic deflection plate 12. This can be accomplished without great precision in the electric field between the deflection plates and a conventional electrostatic scanning system may be employed. It is, however, not possible to cause the electron beam to impinge upon a single element of group 10 for dispersion of the electron beam, together with external influences such as the earth's magnetic field, stray electric fields, etc., prevent precise focusing without the use of complicated and expensive equipment. In my invention I make no attempt to achieve more exact control of the electron beam than that provided by a conventional scanning system and rely on the control exerted by magnetic fields at the screen of the cathode ray tube to provide a means of causing the electron beam to impinge on a predetermined screen element 5, 6 or 7 of image element group 10.

Figure 4:
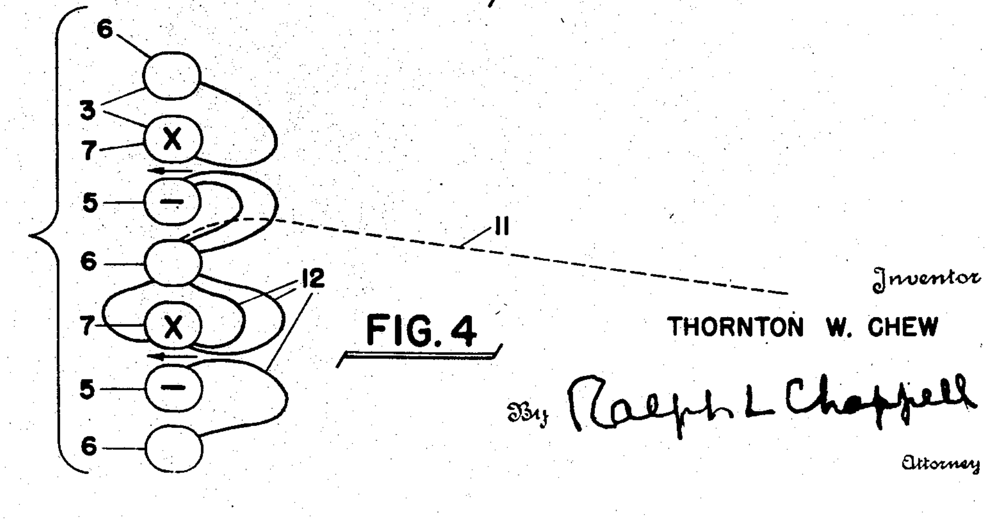
Figure 4 shows the magnetic lines of force due to current in the screen elements.

The wires comprising screen 3 of cathode ray tube 1 are of electro-conductive material adapted to carry an electric current. As shown in Figure 1, I provide for current flow in each separate group of elements independently of current flow in the other elements. In order to cause the electron to impinge upon a particular group of elements, I cause current flow in the other elements tending to cause a magnetic field urging electrons to the element desired. In Figure 4, I have shown current flow in elements 7 in a direction away from the observer and current flow in elements 5 in a direction toward the observer. No current flows in elements 6.

The combination of current flow in elements 5 and 7 causes a magnetic field to be set up producing flux lines substantially as shown at 12. These flux lines are concentrated between elements 5 and 7 and pass through elements 6, and the resultant field urges the electron beam toward the elements 6. In order to achieve maximum concentration of flux lines and a maximum degree of effectiveness from the separate elements 5, 6 and 7, I use a material having a magnetic permeability of high value in the screen elements. Any ferromagnetic material such as iron, nickel, cobalt, etc., can be used for this purpose. Soft iron wire is particularly suitable as it may have a permeability of 1,000 or more.

Figure 5:
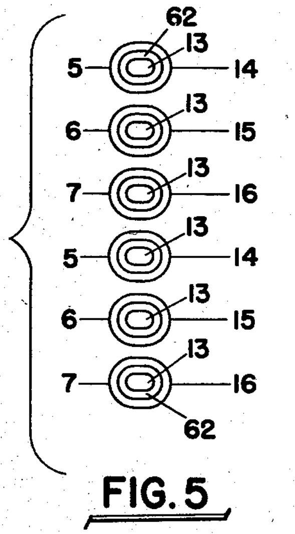
Figure 5 illustrates in detail the construction of the three screen elements of the tube of Figure 2.

Figure 5 shows in greater detail a typical construction of the separate elements of my image screen. Each element consists of a thin wire 13 of size sufficient to carry the current necessary to establish the magnetic field required to cause the electron beam to impinge upon the desired element. Preferably this wire is of material having high permeability. If greater current is required than can be achieved by round wire, an oval or rectangular shape may be used; the long axis of the wire being parallel with the direction of the electron beam. Each wire 13 is covered with a material which emits desired color when excited by an electron beam. In the case of elements 5, the coating 14 is of a material producing a red color. In the case of elements 6, the coating 15 emits a blue color. Finally in the case of elements 7, the coating 16 produces a green color. Alternatively, the fluorescent coatings 14, 15 and 16 may produce white light and filter coatings added to each element to give the desired color.

In addition to the conducting element 13 and the luminescent elements 14, 15 and 16 on the screen elements 5, 6 and 7, an insulating layer 62 is provided. This layer is located between each conducting element 13 and its luminescent surface, 14, 15 or 16. This insulation prevents chemical spoiling of the luminescent surface by the conducting element 13 and also acts as an electrical insulator, thereby increasing the life of the screen and preventing current flow between the conducting elements 13.

Figure 6:
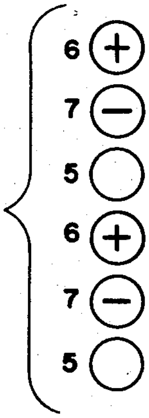
Figures 6, 7 and 8 show the successive directions of current flow in the elements of the screen of the tube of Figure 2.
Figure 7:
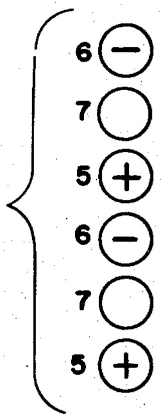
Figure 8:
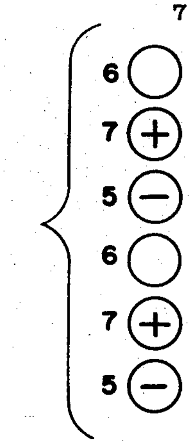

Figures 6, 7 and 8 are enlarged views showing current flow in the separate groups of elements as the electron beam is caused to impinge upon elements 5, 7 and 6 respectively. In Figure 6, it is desired to cause the electron beam to impinge upon elements 5. This is accomplished by causing current flow in one direction in elements 6 and in the opposite direction in elements 7. Although I have shown current flow toward the observer in elements 7 and away from the observer in elements 6, it will be recognized that the opposite current flow will produce the same magnetic effects in so far as deflection of the electron beam toward elements 5 is concerned. In Figure 7, I have shown the current flow required to cause the electron beam to impinge upon elements 7. In this case, current flow may be away from the observer in elements 5 and toward the observer in elements 6, or vice versa. In Figure 8, I have shown the current flow required to cause electron beam to impinge upon elements 6. Current flow toward the observer in elements 5 and away from the observer in elements 7, or the reverse, is required to achieve the desired result.

Figure 9:
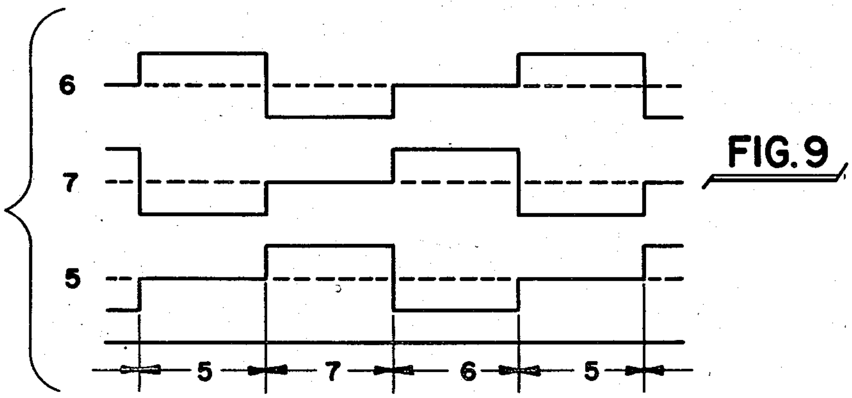
Figure 9 shows the current variation with time in the screen elements of the tube of Figure 2.

Since the electron stream is caused to impinge successively on elements 5, 7 and 6, the current flow in the various elements must be changed in accordance with time in the sequence of Figures 6, 7 and 8. Figure 9 shows one arrangement of current flow to achieve this result. From the standpoint of each separate group of elements, the current flow passes from the negative direction to no current flow to current flow in the positive direction and then back to current flow in the negative direction. This cycle is repeated at the rate the three colors are scanned.

Figure 10:
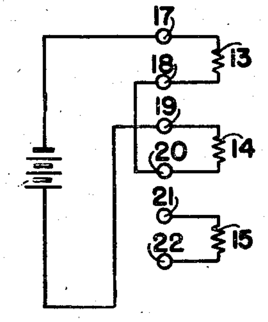
Figures 10, 11 and 12 show the connection of image elements to a common current source required to achieve the current flow shown in Figures 6, 7, 8 and 9.
Figure 11:
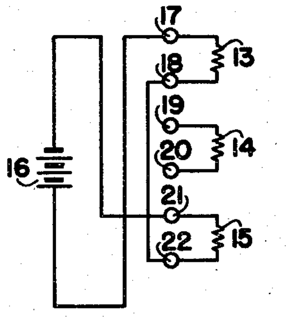

One method of achieving the current flow required in Figures 6, 7, 8 and 9 is by successively applying a direct voltage to combinations of elements 6, 7 and 5. This is shown in detail in Figures 10, 11 and 12, Figure 10 corresponding to Figure 6, Figure 11 corresponding to Figure 7, and Figure 12 corresponding to Figure 8. In Figure 10, direct voltage 16 is connected in series with 13 and 14 which represent elements 6 and 7 respectively. The connection of terminals 17, 18, 19 and 20 of 13 and 14 is arranged so that current flow in 13 is in the opposite direction to current flow in 14. This current flow is shown in more detail for particular elements of groups 13 and 14 by arrows 57 and 58 of Figure 1. In Figure 11, direct voltage 16 is connected to cause current flow in elements 13 and 15 in opposite direction whereas in Figure 12 current flow is in elements 14 and 15 in opposite direction. As discussed above, the same result would be obtained if the reverse current flow is used in both elements, that is, the polarity of direct current source 16 may be reversed without altering the operation of the system.

Figure 12:
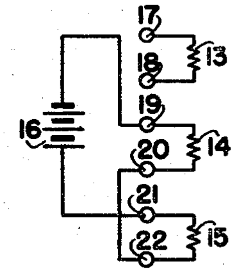
Figure 13:
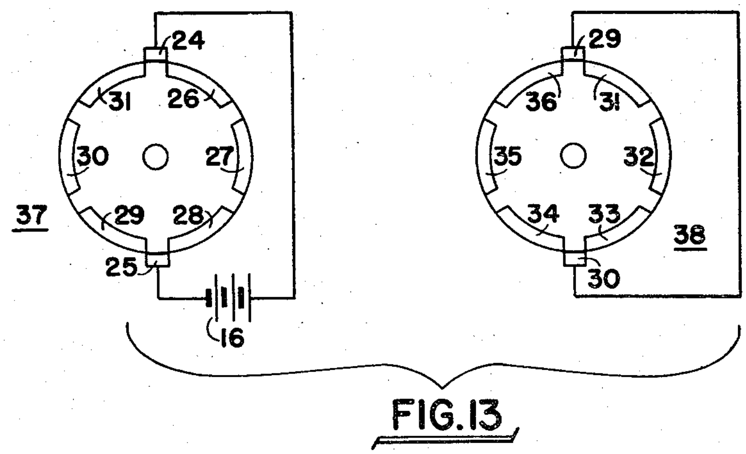
Figure 13 shows a commutator adapted to achieve the current flow shown in Figures 10, 11 and 12.

Figure 13 shows a mechanical commutator system whereby the connections required in Figures 10, 11 and 12 may be automatically obtained. Two commutators 37 and 38 are provided with 6 commutator segments each. The segments on commutator 37 are 26, 27, 28, 29, 30 and 31, whereas the segments on commutator 38 are 31, 32, 33, 34, 35 and 36. Brushes 24 and 25 ride on opposite ends of commutator 37, while brushes 29 and 30 ride on opposite ends of commutator 38. The two commutators are mechanically connected and rotate in synchronism at a velocity determined by the rate at which it is desired to transfer between the three separate groups of color elements. The purpose of commutator 37 is to supply voltage from direct current source 16 to the desired combination of elements 13, 14 and 15. In order to achieve this result, I connect commutator segments 26, 27, 28, 29, 30 and 31 to terminals 17, 18, 19, 20, 21 and 22 of elements 13, 14 and 15 in accordance with Table 1. As the commutator rotates, the voltage from 16 is thereby successively applied to the desired group of elements. The purpose of commutator 38 is to connect elements 13, 14 and 15 together as required for the sequence shown in Figures 10, 11 and 12. In order to do this, I connect commutator segments 31, 32, 33, 34, 35 and 36 to terminals 17, 18, 19, 20, 21 and 22 of elements 13, 14 and 15 as shown in Table 2. Since commutator 37 rotates with commutator 38, I thereby apply voltage 16 to the desired terminal and at the same time connect the desired terminals so as to achieve the sequence shown in Figures 10, 11 and 12. As the commutator rotates, the current is reversed for the same point at two successive cycles of operation, but this does not alter the resultant motion of the electron beam.

TABLE 1

*Connection of commutator 37*

| Commutator Segment | Terminal |
|---|---|
| 29 | 17 |
| 30 | 21 |
| 31 | 19 |
| 26 | 19 |
| 27 | 17 |
| 28 | 21 |

TABLE 2

*Connection of commutator 38*

| Commutator Segment | Terminal |
|---|---|
| 34 | 18 |
| 35 | 18 |
| 36 | 20 |
| 31 | 20 |
| 32 | 22 |
| 33 | 22 |

As an alternative to the above described mechanical commutator system, an electronic method may be used. This system could consist of triggered relaxation oscillators arranged to cause current flow in each screen element in accordance with the requirements of Figures 6, 7, 8 and 9.

Figure 14:
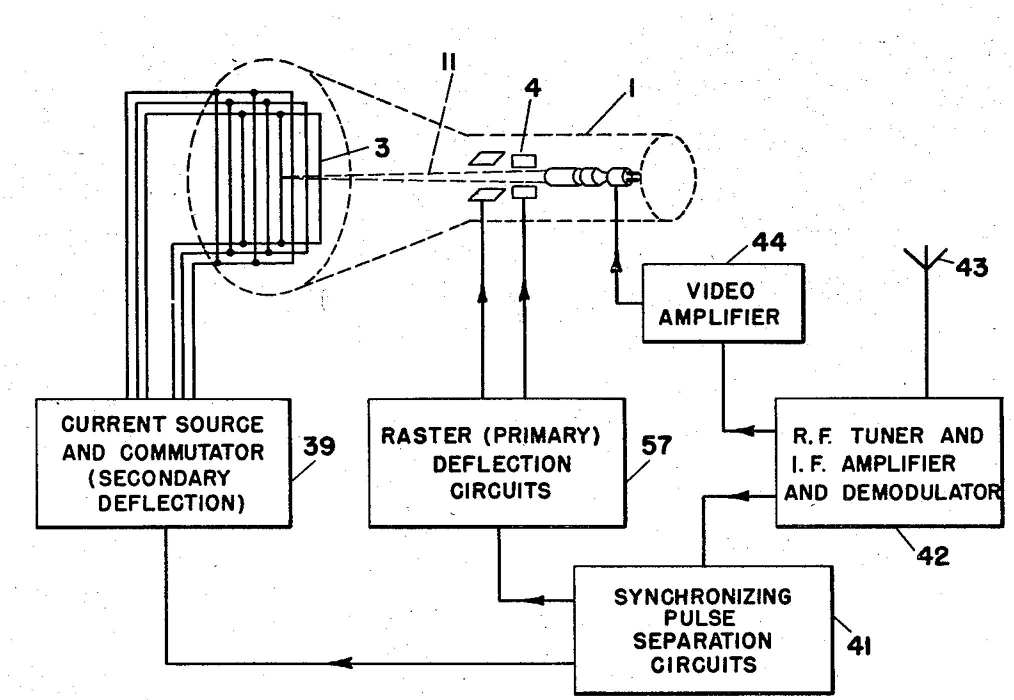
Figure 14 shows in block form a complete television receiving system embodying my invention as shown in Figure 1.

A complete television receiving system showing the application of my invention is shown in Figure 14. In the system, 43 is an antenna by which radio frequency energy containing television intelligence is received, and 42 is a radio receiver producing video frequency output together with timing signals. Output of unit 42 is passed to video amplifier 44 which places upon a control grid in cathode ray tube 1 a signal proportional to the received signal from the antenna. Also from unit 42 a circuit goes to the synchronizing and separation unit 41. This unit feeds the raster deflection circuit 57 which applies to elements 4 of cathode ray tube 1 suitable deflecting potentials causing cathode ray beam 11 to impinge upon a particular group 10. Unit 41 also feeds current source and commutator 39 which in turn applies current to elements 5, 6 and 7 of screen, thereby causing the electron beam 11 to impinge on the desired element of screen 3. Synchronizing pulses received through antenna 43, receiver 42, and separating circuit 41, cause unit 39 to excite the separate groups of elements 5, 6 and 7 in accordance with the scanning at the television transmitter, thereby coordinating the receiver with the transmitter and producing a faithful color television image.

Proper choice of the area of the conductors in the screen elements of my invention as shown in Figure 1 permits operating the luminescent material at a predetermined high temperature, thereby taking advantage of the most favorable operating temperature of the phosphor.

Figures 15, 16 and 17 show an alternate form of my television receiving system. In this form, I provide a cathode ray tube screen consisting of a group of small screen elements of para-magnetic and diamagnetic particles. Each particle is covered with a fluorescent material, the material on the paramagnetic particles producing one color and the material on the diamagnetic particles producing another color. To provide a means of selectively producing one color, I provide a transverse magnetic field produced by elements 49 and 50 and a coaxial magnetic field produced by coil 51.

The diamagnetic material composing screen elements 47 has a permeability of less than unity. As a result, magnetic flux tends to avoid these elements and take other paths having less reluctance. When the transverse magnetic field is produced by coil 50 and magnetic core 49, the flux distribution through the elements composing the tube screen is substantially as shown in Figure 15*a*. As shown in the figure, the magnetic flux tends to pass around diamagnetic elements 47 and through paramagnetic elements 46. Accordingly electrons impinging on the screen in a direction perpendicular to the cross section shown in the figure are deflected by the strong magnetic field at paramagnetic particles 46 since a force acts on these electrons normal to the direction of the magnetic field and to their direction of motion. Hence, when the transverse magnetic field is used, the color corresponding to diamagnetic elements 47 is produced.

When the coaxial magnetic field is produced by current in coil 51, magnetic lines of force parallel to the direction of motion of the electrons pass through elements 46 and 47. Since the paramagnetic elements 46 have a permeability greater than unity, and the diamagnetic elements have a permeability less than unity, the flux tends to pass through elements 46. This causes the electron beam to tend to impinge on paramagnetic elements 46 as shown in Figure 16 and the color corresponding to these elements is produced.

In order to produce a composite two-color television image, I alternately excite axial field coil 51 and transverse field coil 50 in accordance with the scanning color desired. I accomplished this by use of a source of commutated electric current 52, Figure 17, triggered by signals indicating the color being scanned by the television transmitter.

Since the control over the electron beam 11 produced by the magnetic field of transverse coil 50 or coaxial coil 51 is restricted to the region immediately adjacent to the screen, the two fields are arranged to provide a narrow flux distribution. In the case of the transverse magnetic structure 49, this can be accomplished by using a narrow shape as shown in the cross section of Figure 15*b*. In the case of the coaxial magnetic field, coil 51 is made very narrow with respect to its diameter, thereby achieving maximum concentration of the field.

A third modification of my invention is shown in cross section in Figure 18. In the figure, 53 represents a transparent screen adapted to produce a primary color, say green. Elements 54 consist of parallel transverse strips having a material on the upper surface 56 adapted to produce a second primary color, say red, when an electron beam impinges upon this surface. On lower surface 55 of elements 54, I provide a second coating of material adapted to produce a third primary color, blue, when electrons impinge upon that surface. Hence, I am enabled to produce the three primary colors by having the electron beam impinge upon screen 53, upper surface 56 of elements 54 and lower surface 55 of elements 54. In order to focus electron beams 11, I provide a transverse magnetic field in the plane and immediate vicinity of the elements 54 and parallel with them. When this field is in the direction into the elements as shown in Figure 18, the cathode ray beam 11 is deflected upward toward the under surface 55 of elements 54. This is the condition shown in Figure 18. When the field is not excited, the electrons continue through the screen formed by elements 54 to screen 53 where the color corresponding to the coating on 53 is produced. When the magnetic field is in a direction out of the cross-section shown in Figure 18, the electron beam is deflected downward to upper surface 56 of element 54, thereby producing the third primary color. By providing a selective excitation of the magnetic field in accordance with synchronizing pulses from the television transmitter, I am enabled to selectively produce the three primary colors in accordance with the scanning of the television transmitter, thereby reproducing a television image in its natural color.

Figure 19 shows in perspective the disposition of the cathode ray tube 1, electron beam 11, screen elements 53 and 54 and magnetic field coils 63 used in my invention as shown in Figure 18.

Figure 20 shows an alternate method by which my invention as shown in Figure 18 may be practiced. In the figure, the cathode ray tube screen consists of plate 57 having a plurality of parallel grooves 58 and preferably of high reluctivity material. The upper surface of the groove 57 is coated with a luminescent material which produces one primary color when struck by an electron beam. The bottom surface of each groove 60, is coated with a luminescent material producing a second primary color when impinged upon by an electron beam. The lowest surface of each group 61 is coated with a material producing a third primary color when struck by the electron beam. By providing a transverse magnetic field similar to that used in my invention as shown in Figure 18, I am able to selectively cause electron beam 11 to impinge upon surfaces 59, 60 and 61. I therefore selectively produce any one color on the cathode ray tube screen in accordance with scanning of the television transmitter.

In addition to producing a color television image, my television system as described herein is capable of use in the transmission of stereoscopic images by using of one color to show the picture taken from one stereoscopic camera and another color to show the picture from a second stereoscopic camera. This method is well known in the art, being described in more detail in Patent 2,307,188.

The invention described herein may be manufactured and used by or for the Government of the United States of America for governmental purposes without the payment of any royalties thereon or therefor.

My invention as described herein, is capable of wide variation and modification without departing from the spirit and scope of the invention as set forth in the appended claims.

I claim as my invention:

1. In a television system including a transmitter and a receiver, a cathode ray tube in said receiver having an image modulated electron beam, means deflecting said beam in accordance with signals from said transmitter, a screen comprising electrically parallel screen wires having a dimension perpendicular to said electron beam and to their length small compared to the size of the image elements on said screen and arranged in a multiplicity of interleaved groups, the elements of each group having a common connection at each side of said screen and adapted to produce a primary color when impinged upon by the electron beam, a magnetic flux producer including said screen wires and causing flux around said wires and causing said beam to selectively impinge upon one of said groups in accordance with the scanning of objectives by said transmitter.

2. In a color television receiver, a cathode ray tube, a screen in said tube comprising parallel conducting elements coated with fluorescent material, said conducting screen elements being divided electrically into a plurality of groups, the elements of each group being arranged in interleaved order, the elements in each group being adapted to produce a common color different from that of any other group when impinged upon by an electron beam and being connected in parallel in a closed electrical circuit, and a source of electric current intermittently energizing said circuits in such sequence as to cause the electron beam in said tube to selectively impinge upon said groups in accordance with the color group desired to be actuated.

3. In a television receiver for receiving television images in natural color, a cathode ray tube, an electron beam in said tube, a screen in said tube composed of parallel conducting screen elements covered with luminescent material, said conducting elements being electrically connected in three groups, the elements of each group being electrically parallel connected in a closed electrical circuit and interspersed with elements of the other groups and adapted to produce upon excitation by said electron beam a particular color, a source of electric current energizing said circuits in such sequence as to produce current flow in said conducting elements including magnetic fields of direction effective to cause said electron beam to selectively impinge upon a particular group in accordance with the scanning of said television system.

4. A television system as in claim 1, the screen wires composed of ferromagnetic material.

5. A television receiver as in claim 2, the screen elements composed of ferromagnetic material.

6. A television receiver as in claim 3, the screen elements composed of ferromagnetic material.

7. In a television system including a transmitter, an image scanner in said transmitter cyclically responsive to at least three different image colors, a cathode ray tube, a screen in said tube composed of parallel conducting elements coated with fluorescent material, said elements being insulated from said fluorescent material and electrically separated into interleaved color groups corresponding in number to the colors scanned by said image scanner, the elements of each of said groups being electrically parallel connected in a closed electrical circuit, a source of commuted electric current so energizing said circuits as to cause current flow and consequent beam-deflecting magnetic fields in opposite directions in the two color groups adjacent to the group corresponding in color to the group being scanned by said transmitter.

8. In a television system, a cathode ray tube, an electron beam in said tube, a screen in said tube comprised of parallel conducting elements close to luminescent material, said elements electrically separated into three color groups and insulated from said material, the elements of each of said groups being electrically parallel connected in a closed electrical circuit, and singly interspersed with one another, a source of commuted electric current energizing said circuits in such sequence as to produce a magnetic field around said elements causing the electron beam to successively scan the separate color groups in accordance with the scanning of an image by said transmitter.

9. In a color television receiver, a cathode ray tube, a screen in said tube comprised of parallel conducting screen elements having a non-circular cross section, the largest cross-sectional dimension of said elements being positioned normal to the plane of said screen, the small dimension of said elements being small compared to the image elements in said tube, and a closed electrical circuit including said elements connected in parallel with each other to a current source.

10. In a cathode ray tube, an electron beam, a screen composed of parallel conducting screen elements coated with a luminescent material, the elements being connected in groups in parallel in closed electrical circuits, a source of commuted electric current connected to said circuits in such sequence as to cause said electron beam to selectively impinge on said elements.

11. A cathode ray tube screen comprising interspersed ferromagnetic and diamagnetic particles covered with luminescent material.

12. A cathode ray tube screen comprising a random combination of particles of ferromagnetic material coated with luminescent material of one color and particles of diamagnetic material coated with luminescent material of another color.

13. The method of producing color television images, comprising passing longitudinal and transverse magnetic fields selectively in accordance with the instantly televised member of a complementary color pair on a cathode ray tube screen composed of a random combination of particles of ferromagnetic material coated with luminescent material of one color of said pair, and particles of diamagnetic material coated with luminescent material of the complementary color and scanning the screen with an electron beam in accordance with the scanning of the image by a transmitter.

14. In a television system including a transmitter and a receiver, a cathode ray tube in said receiver, a screen in said tube comprising a heterogeneous mixture of particles of ferromagnetic material coated with luminescent material of one color, and particles of diamagnetic material coated with luminescent material of a complementary color, means producing a transverse magnetic field across said screen, means producing a coaxial magnetic field through said screen, means actuating said magnetic field producing means selectively in accordance with the scanning of respective color images by said transmitter.

15. In a cathode ray tube, an electron beam, a screen adapted to produce colored illumination upon incidence of an electron beam, a plurality of parallel spaced screen elements mounted parallel to said screen and adapted to produce one color when struck from below by an electron beam and a second color when struck from above by an electron beam, a magnetic field around said elements adapted to cause said electron beam to selectively impinge upon said elements and said screen.

16. In a cathode ray tube, a screen composed of a plate, a plurality of grooves on one side of said plate and upon which an electron beam impinges, each of said grooves having three plane sides, one of the said sides normal to the electron beam and two of said sides approximately in the plane of said beam and parallel to each other, each of said plane sides coated with a luminescent material, the coating on each of said sides producing a different primary color when impinged upon by an electron beam and a magnetic field around said plate adapted to cause said electron beam to selectively impinge upon said planes.

17. In a color television receiver, a cathode ray tube, an electron beam, a screen composed of a transparent plate, a plurality of parallel grooves on one side of said plate and upon which an electron beam impinges, each of said grooves having three plane sides, one of the said sides being normal to the electron beam, and the other two sides being parallel to the electron beam and approximately parallel to each other, each of said plane sides being coated with a luminescent material producing a different primary color when struck by an electron beam, an electro-magnet associated with said stream at the screen and adapted to cause said electron beam to selectively impinge upon said plane sides.

18. A cathode ray tube, a screen in said tube comprised of recurrent groups of elemental areas of luminescent material, each group including areas of a plurality of colors of luminesence, and a magnetic field producer in close proximity to said screen operative to set up a magnetic field around said elemental areas.

19. A television system as in claim 8, the luminescent material coated on each screen element.

20. A cathode ray tube as in claim 15 in which the first mentioned screen is transparent.

21. A cathode ray tube as in claim 16 in which the plate is transparent.

22. In a cathode ray tube, a screen, a plurality of parallel conducting elements substantially in the plane of said screen and divided into groups the elements of each group being connected in parallel in a closed electrical circuit, luminescent material close to said elements, said luminescent material having a different color of luminescence for each group and means for intermittently supplying current to each closed circuit.

23. A cathode ray tube as in claim 22, the luminescent material comprising a coating on each conducting element.

24. A cathode ray tube as in claim 22, the luminescent material comprising a coating on each conducting element and separated therefrom by an insulating material.

25. The method of producing a color television picture wherein an electron beam is directed to one of a group of electrically parallel interleaved conducting elements characterized by the step of causing current flow in one direction in the elements on one side of said group and current flow in the opposite direction in the elements on the other side of said group.

26. In a television system, a receiver, a cathode ray tube in said receiver having an image modulated electron beam, means deflecting said beam in accordance with signals from said transmitter, a screen comprised of a multiplicity of screen wires arranged in three interleaved groups, the elements of each group electrically parallel connected in a closed circuit, means under control of the transmitter for supplying current to each closed circuit in such sequence as to produce magnetic flux around said wires in said groups in accordance with the scanning of an objective by said transmitter.

27. In a television system, a receiver, a cathode ray tube in said receiver having an image modulated electron beam, means deflecting said beam in accordance with signals from said transmitter, a screen comprised of parallel wires having a dimension perpendicular to said electron beam comparable in size to image elements on said screen and arranged in a multiplicity of interleaved groups, the wires in each group being connected in parallel in a closed electrical circuit, means under control of the transmitter for supplying current to each closed circuit in such sequence as to produce magnetic flux around the wires in said groups causing said beam to selectively impinge on said groups in accordance with scanning of objectives by said transmitter.

28. In a television system, a receiver, a cathode ray tube in said receiver having an image modulated electron beam, means deflecting said beam in accordance with signals from said transmitter, a screen comprised of parallel screen wires arranged in a multiplicity of interleaved groups, the elements of each group being connected in parallel in a closed electrical circuit and adapted to produce a common color when impinged upon by an electron beam, means intermittently supplying current to each closed circuit in such sequence as to produce magnetic flux around said wires causing said beam to selectively impinge on said groups in accordance with the scanning of objectives by said transmitter.

29. In a color television receiver, a cathode ray tube, a screeen in said tube comprising parallel conducting elements coated with fluorescent material, said conducting screen elements being divided into a plurality of groups, the elements of each group being electrically connected in parallel in a closed electrical circuit and arranged in interleaved order, a source of electric current supplying current to each closed circuit in such sequence as to cause the electron beam in said tube to selectively impinge upon said groups in accordance with the color group desired to be actuated.

30. In a television system including a transmitter, an image scanner in said transmitter cyclically responsive to image colors, a cathode ray tube, a screen in said tube composed of parallel conducting elements coated with fluorescent material, said elements being electrically separated into interleaved color groups corresponding in number to the colors scanned by said image scanner, the elements of each of said groups being electrically parallel connected in a closed electrical circuit including a source of commuted electric current, said source disposed to cause current flow in opposite directions in the two color groups adjacent to the group corresponding in color to the group being scanned by said transmitter.

31. In a cathode ray tube, a screen composed of a plate, a plurality of grooves on one side of said plate and upon which an electron beam impinges, each of said grooves having three plane sides, one of the said sides normal to the electron beam and two of said sides approximately in the plane of said beam and parallel to each other, each of said plane sides coated with a luminescent material, the coating on each of said sides producing a different color when impinged upon by an electron beam and magnetic means for causing the beam to selectively impinge on the plane sides of the grooves for selective color production thereon.

32. In a television system including a transmitter and a receiver, a cathode ray tube in said receiver having an image modulated electron beam, means deflecting said beam in accordance with signals from said transmitter, a substantially planular screen comprised of a multiplicity of uniformly interspersed groups of elements, each group of elements having characteristics which differ from any other group when said electron beam impinges thereon, at least one closed electrical circuit for producing resultant magnetic fields in the plane of said screen which direct said electron beam during deflection thereof to impinge upon said groups of elements in sequence, and means under control of the transmitter for supplying current to said circuit.

33. In a television system including a transmitter and a receiver, a cathode ray tube in said receiver having an image modulated electron beam, means deflecting said beam in accordance with signals from said transmitter, a screen comprised of a multiplicity of elements arranged in a plurality of uniformly interspersed groups, means characterized by a negligible electric potential causing a varying magnetic field about said screen elements, said magnetic field being arranged to cause said electron beam to impinge selectively upon each of said groups in accordance with the scanning of an objective by said transmitter.

THORNTON W. CHEW.

REFERENCES CITED

The following references are of record in the file of this patent:

UNITED STATES PATENTS

| Number | Name | Date |
|---|---|---|
| 2,280,946 | Goldsmith | Apr. 28, 1942 |
| 2,294,820 | Wilson | Sept. 1, 1942 |
| 2,307,188 | Bedford | Jan. 5, 1943 |
| 2,312,792 | Baeuford | Mar. 2, 1943 |
| 2,416,056 | Kallmann | Feb. 18, 1947 |
| 2,446,249 | Schroeder | Aug. 3, 1948 |
| 2,446,440 | Swedlund | Aug. 3, 1948 |
| 2,461,515 | Bronwell | Feb. 15, 1949 |

FOREIGN PATENTS

| Number | Country | Date |
|---|---|---|
| 443,896 | Great Britain | Mar. 10, 1936 |